(12) United States Patent
Lin

(10) Patent No.: US 6,944,758 B2
(45) Date of Patent: Sep. 13, 2005

(54) BACKUP METHOD FOR INTERFACE BIOS BY MAKING BACKUP COPY OF INTERFACE BIOS IN SYSTEM BIOS AND EXECUTING BACKUP INTERFACE BIOS IN SYSTEM BIOS IF ERROR OCCURS

(75) Inventor: Johnson Lin, Taipei (TW)

(73) Assignee: Giga-Byte Technology Co., Ltd., Taipei (TW)

(*) Notice: Subject to any disclaimer, the term of this patent is extended or adjusted under 35 U.S.C. 154(b) by 0 days.

(21) Appl. No.: 10/402,158

(22) Filed: Mar. 31, 2003

(65) Prior Publication Data
US 2004/0193866 A1 Sep. 30, 2004

(51) Int. Cl.[7] .............. G06F 9/00; G06F 9/06; G06F 9/445; G06F 11/00
(52) U.S. Cl. ............ 713/2; 710/8; 710/9; 710/10; 713/1; 713/100; 714/2; 714/5; 714/6; 714/11; 714/15; 714/20; 714/25; 714/38; 714/39; 714/747
(58) Field of Search ............. 710/8–10; 713/1, 713/2, 100; 714/5, 6, 11, 20, 25, 747, 15, 2, 38, 39

(56) References Cited

U.S. PATENT DOCUMENTS

| | | | | |
|---|---|---|---|---|
| 5,964,873 A | * | 10/1999 | Choi | 713/2 |
| 6,009,520 A | * | 12/1999 | Gharda | 713/1 |
| 6,185,696 B1 | * | 2/2001 | Noll | 714/6 |
| 6,253,281 B1 | * | 6/2001 | Hall | 711/112 |
| 6,393,492 B1 | * | 5/2002 | Cornaby et al. | 719/321 |
| 6,401,198 B1 | * | 6/2002 | Harmer et al. | 713/1 |
| 6,611,850 B1 | * | 8/2003 | Shen | 707/204 |
| 6,629,259 B2 | * | 9/2003 | Lee | 714/2 |
| 6,633,976 B1 | * | 10/2003 | Stevens | 713/2 |
| 6,651,188 B2 | * | 11/2003 | Harding et al. | 714/38 |
| 6,684,229 B1 | * | 1/2004 | Luong et al. | 707/204 |
| 6,725,178 B2 | * | 4/2004 | Cheston et al. | 702/186 |
| 2003/0051125 A1 | * | 3/2003 | Lu | 713/1 |
| 2003/0126511 A1 | * | 7/2003 | Yang et al. | 714/39 |
| 2003/0188223 A1 | * | 10/2003 | Alexis | 714/13 |
| 2004/0025002 A1 | * | 2/2004 | Cepulis et al. | 713/2 |
| 2004/0088534 A1 | * | 5/2004 | Smith et al. | 713/1 |
| 2004/0103347 A1 | * | 5/2004 | Sneed et al. | 714/32 |

* cited by examiner

Primary Examiner—Tammara Peyton
(74) Attorney, Agent, or Firm—Rabin & Berdo, P.C.

(57) ABSTRACT

A backup method for the basic input/output system (BIOS) of computer interfaces is disclosed. When the BIOS of an interface is broken, the backup BIOS stored in the computer can be transferred to the interface for maintaining normal operations.

12 Claims, 3 Drawing Sheets

BACKUP METHOD FOR INTERFACE BIOS BY MAKING BACKUP COPY OF INTERFACE BIOS IN SYSTEM BIOS AND EXECUTING BACKUP INTERFACE BIOS IN SYSTEM BIOS IF ERROR OCCURS

BACKGROUND OF THE INVENTION

1. Field of Invention

The invention relates to a BIOS backup method and, in particular, to a backup method for the BIOS of interfaces.

2. Related Art

Nowadays, the use of computer systems has become very popular, not only in businesses but also in general public. One important component in computer systems is the basic input/output system (BIOS), which is a program installed in read-only memory (ROM) and contains many basic subroutines related to input/output (I/O). It is firmware on the mother board (M/B) with certain relations with computer hardware. Arbitrarily changing or modifying the BIOS on the M/B may result in the breakdown of the computer system.

The main function of the BIOS is to control the operations of the central processing unit (CPU) and various chips and the processes on all standard peripheral devices, such as the printer, mouse, keyboard, hard disk drive (HDD), and floppy disk drive (FDD). When the BIOS starts the computer system, it first assures that all interfaces are correctly functioning before loading the operating system (OS) from the HDD or FDD to random access memory (RAM).

Once the BIOS is installed, the OS and application programs do not need to specify detailed information about I/O devices (such as the hardware addresses). If the information is changed, one only needs to change the BIOS, not the OS or individual applications. The BIOS thus plays a very important role here. However, current interfaces in computer systems are installed with their own BIOS. Any error occurring to their BIOS may affect the normal functioning of the interfaces or even the whole computer system. Therefore, we need a method to prevent the errors happening to the interface BIOS from affecting the normal computer operations.

SUMMARY OF THE INVENTION

In view of the foregoing, the invention provides a backup method for interface BIOS. Its objective is to prevent possible bad effects from happening as a result of the interface BIOS being damaged. The interface BIOS is backed up according to the invention. When any interface BIOS is damaged, the computer system sends the backup copy of the interface BIOS to the corresponding interface, maintaining the normal operations of the interface and the computer system.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 1:
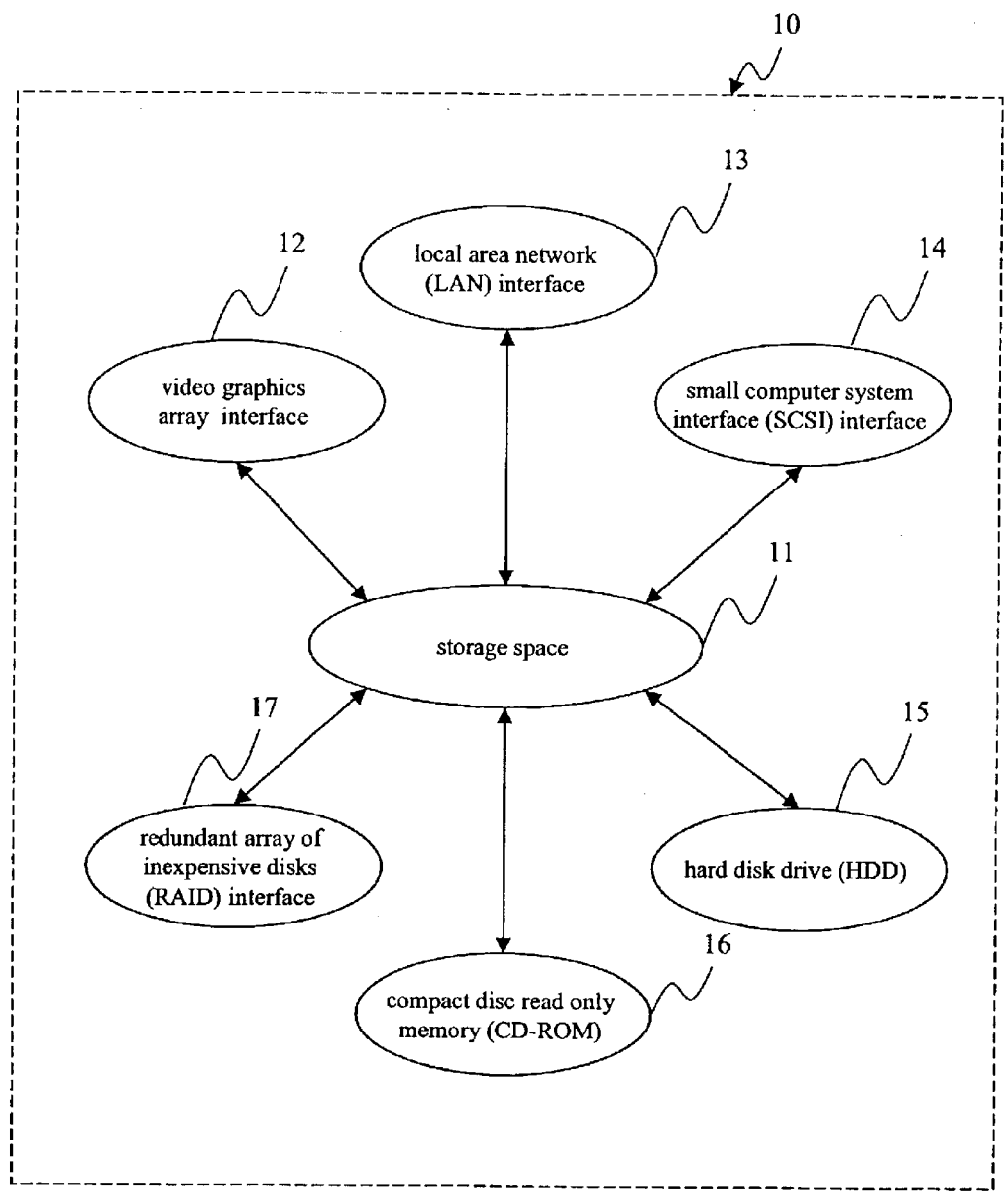
FIG. 1 is a schematic view of the computer system using the disclosed interface BIOS backup method.

Please refer to FIG. 1, which provides a schematic view of a computer system. According to the invention, the BIOS of interfaces associated with a computer device 10 is backed up inside a storage space 11. Such interfaces include the video graphics array (VGA) interface 12, the local area network (LAN) interface 13, the small computer system interface (SCSI) interface 14, the hard disk drive (HDD) 15, the compact disc read only memory (CD-ROM) 16, redundant array of inexpensive disks (RAID) interface 17, etc. The storage space 11 can be the BIOS of the mother board (M/B) or external flash memory.

When the BIOS of any interface is damaged, the backup interface BIOS kept in the storage space 11 is first executed to maintain the normal operations of the computer system 10. The backup interface BIOS is further sent to and stored in the corresponding interface.

Figure 2:
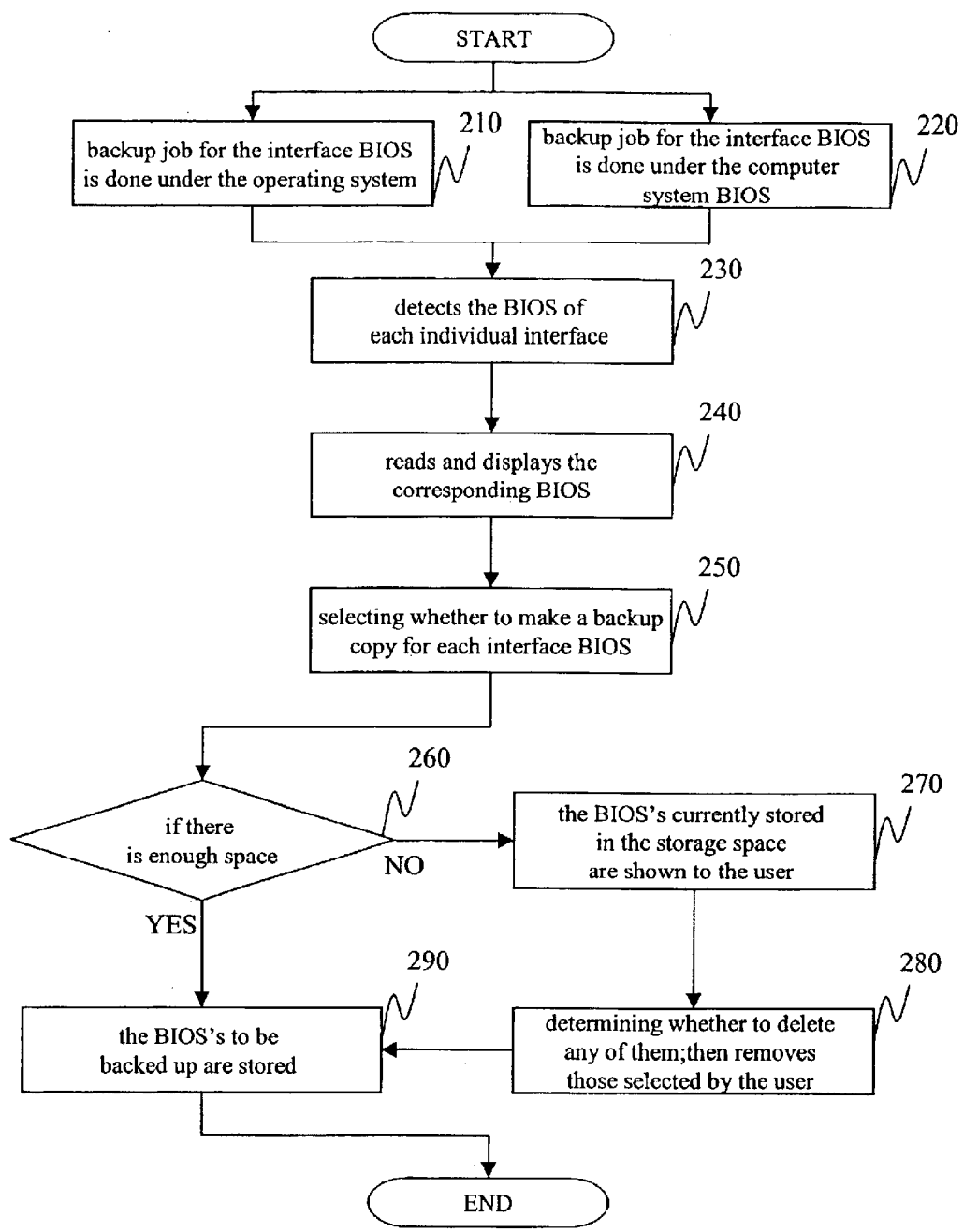
FIG. 2 is a flowchart of the backup steps in the disclosed method.

The disclosed interface BIOS backup method includes the backup part and the recovery part. We use FIG. 2 to explain in detail the backup steps in the invention.

First, the computer system performs the backup job for the interface BIOS. This part can be done under the operating system (OS) (step 210) or under the computer system BIOS (step 220). The computer system detects the BIOS of each individual interface (step 230), reads and displays the corresponding BIOS (step 240). The user selects whether to make a backup copy for each interface BIOS (step 250). Once the user completes the selection, the computer system determines if there is enough space in the storage space (step 260). If the storage space is large enough, the BIOS's to be backed up are stored (step 290). If the storage space is not large enough, the BIOS's currently stored in the storage space are shown to the user (step 270). The user determines whether to delete any of them; the computer system then removes those selected by the user (step 280). The BIOS's to be backed up are then stored after the deletion is completed (step 290).

Figure 3:
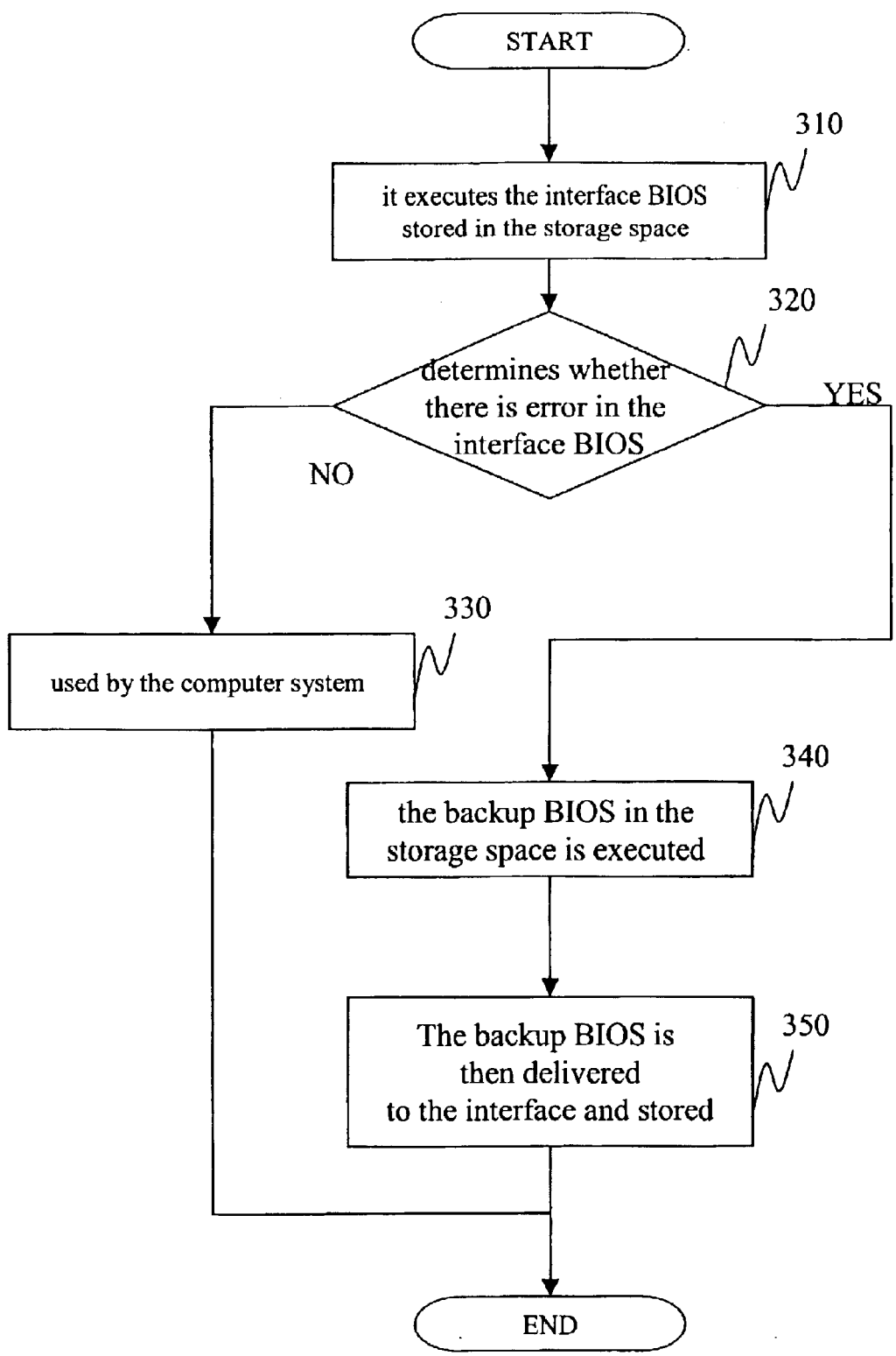
FIG. 3 is a flowchart of how the disclosed method recovers the interface BIOS.

In the following, we use FIG. 3 to explain how the invention recovers an interface BIOS. Once the previously mentioned backup steps are finished, the computer system starts normal operations. First, it executes the interface BIOS stored in the storage space (step 310). It then determines whether there is error in the interface BIOS (step 320). If all of the interface BIOS is normal, then they are used by the computer system (step 330). If there is any error in an interface BIOS, the backup BIOS in the storage space is executed (step 340) for the interface operating normally. The backup BIOS is then delivered to the interface and stored. (step 350).

As described above, the disclosed interface BIOS backup method backs up the BIOS of each interface in a computer system. One advantage is that when any interface BIOS is damaged, the computer system can use the backup copy to keep working. Thus, normal operations of the computer will not be affected, and the computer system efficiency can be increased too. Another advantage of the invention is that the backup BIOS is sent to the corresponding interface and is stored there. This recovers the interface BIOS on the corresponding interface without reinstalling. Therefore, it is much more convenient.

Certain variations would be apparent to those skilled in the art, which variations are considered within the spirit and scope of the claimed invention.

What is claimed is:

1. An interface basic input/output system (BIOS) backup method for a computer system, comprising the steps of:

executing a program to back up an interface BIOS of an interface under the operating system (OS) of the computer system;

detecting the interface BIOS of the interface;

reading the interface BIOS and displaying it;

checking the storage space in the computer BIOS and making a backup copy of the interface BIOS in the computer BIOS;

executing the computer BIOS;

checking the interface BIOS of the interface;

executing the backup interface BIOS in the computer BIOS when any error occurs to the interface BIOS; and sending the backup interface BIOS to the interface for storage when there is an error in the interface BIOS.

2. The method of claim 1, wherein the computer system BIOS is the basic BIOS of a mother board (M/B).

3. The method of claim 1, if the storage space in the computer system BIOS is found to be insufficient in the step of checking the storage space in the computer BIOS, further comprises the steps of:

displaying the computer system BIOS program; and providing a deleting mechanism to increase the storage space in the computer system BIOS.

4. The method of claim 1, wherein the interface executes its BIOS when there is no error.

5. An interface basic input/output system (BIOS) backup method for a computer system, comprising the steps of:

executing a program to back up an interface BIOS of an interface under the computer system BIOS;

detecting the interface BIOS of the interface;

reading the interface BIOS and displaying it;

checking the storage space in the computer BIOS and making a backup copy of the interface BIOS in the computer BIOS;

executing the computer BIOS;

checking the interface BIOS of the interface;

executing the backup interface BIOS in the computer BIOS when any error occurs to the interface BIOS; and sending the backup interface BIOS to the interface for storage when there is an error in the interface BIOS.

6. The method of claim 5, wherein the computer system BIOS is the basic BIOS of a mother board (M/B).

7. The method of claim 5, if the storage space in the computer system BIOS is found to be insufficient in the step of checking the storage space in the computer BIOS, further comprising the steps of:

displaying the computer system BIOS program; and providing a deleting mechanism to increase the storage space in the computer system BIOS.

8. The method of claim 5, wherein the interface executes its BIOS when there is no error.

9. An interface basic input/output system (BIOS) backup method for a computer system, comprising the steps of:

executing a program to back up an interface BIOS of an interface in the computer system;

detecting the interface BIOS of the interface;

reading the interface BIOS and displaying it;

checking an external storage device and storing in the external storage device a backup copy of the interface BIOS;

executing the computer BIOS;

checking the interface BIOS of the interface;

executing the backup interface BIOS in the external storage device when any error occurs to the interface BIOS, and sending the backup interface BIOS to the interface for storage when there is an error in the interface BIOS.

10. The method of claim 9, wherein the external storage device is flash memory.

11. The method of claim 9, if the storage space in the external storage device is found to be insufficient, further comprising the steps of:

displaying the computer system BIOS program; and providing a deleting mechanism to increase the storage space in the external storage device.

12. The method of claim 9, wherein the interface executes its BIOS when there is no error.

* * * * *